April 6, 1965

R. O. GORDON 3,176,721

HYDRAULIC VALVE

Filed Oct. 4, 1963

INVENTOR
RICHARD O. GORDON
BY
Kenneth C. Witt
ATTORNEY

April 6, 1965 R. O. GORDON 3,176,721
HYDRAULIC VALVE
Filed Oct. 4, 1963 6 Sheets-Sheet 2
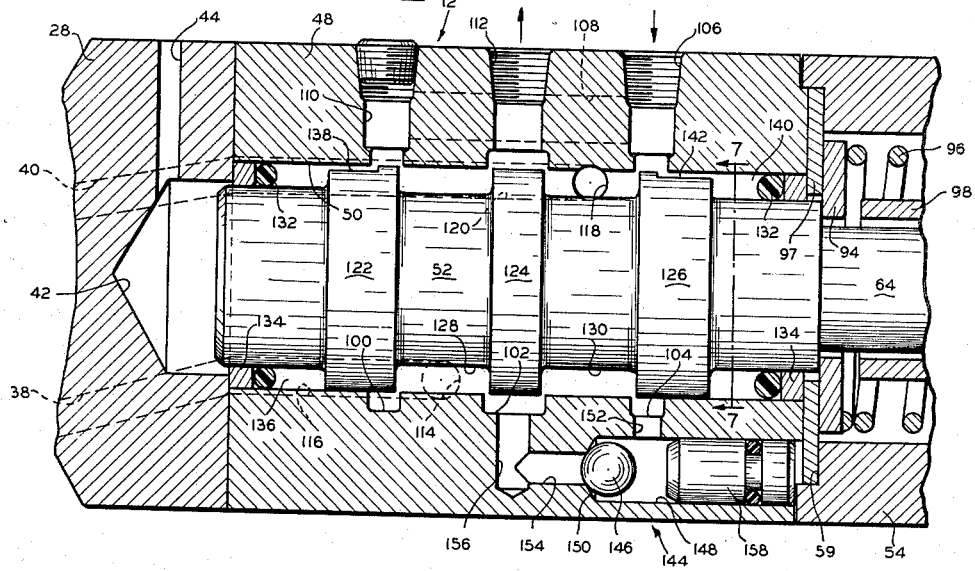
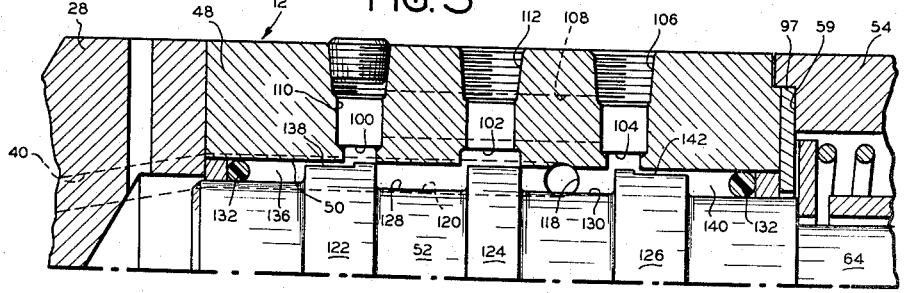
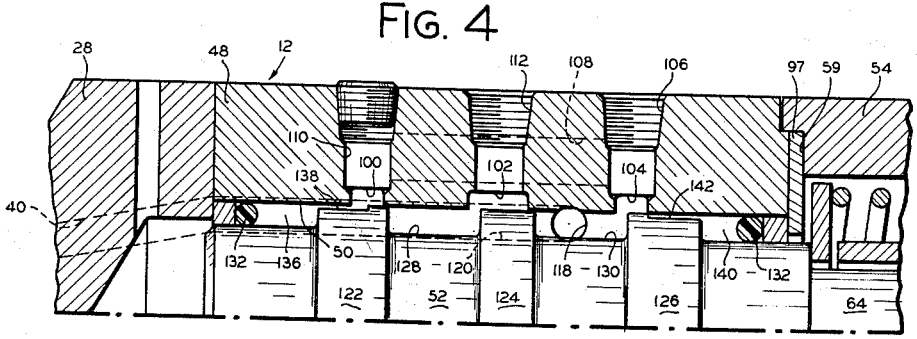
INVENTOR
RICHARD O. GORDON
BY Kenneth C. Witt
ATTORNEY April 6, 1965  R. O. GORDON  3,176,721
HYDRAULIC VALVE Filed Oct. 4, 1963  6 Sheets-Sheet 3

INVENTOR
RICHARD O. GORDON
BY
Kenneth C. Witt
ATTORNEY

April 6, 1965 R. O. GORDON 3,176,721
HYDRAULIC VALVE

Filed Oct. 4, 1963 6 Sheets-Sheet 5

INVENTOR
RICHARD O. GORDON
BY
*Kenneth C. Witt*
ATTORNEY

April 6, 1965   R. O. GORDON   3,176,721
HYDRAULIC VALVE
Filed Oct. 4, 1963   6 Sheets-Sheet 6
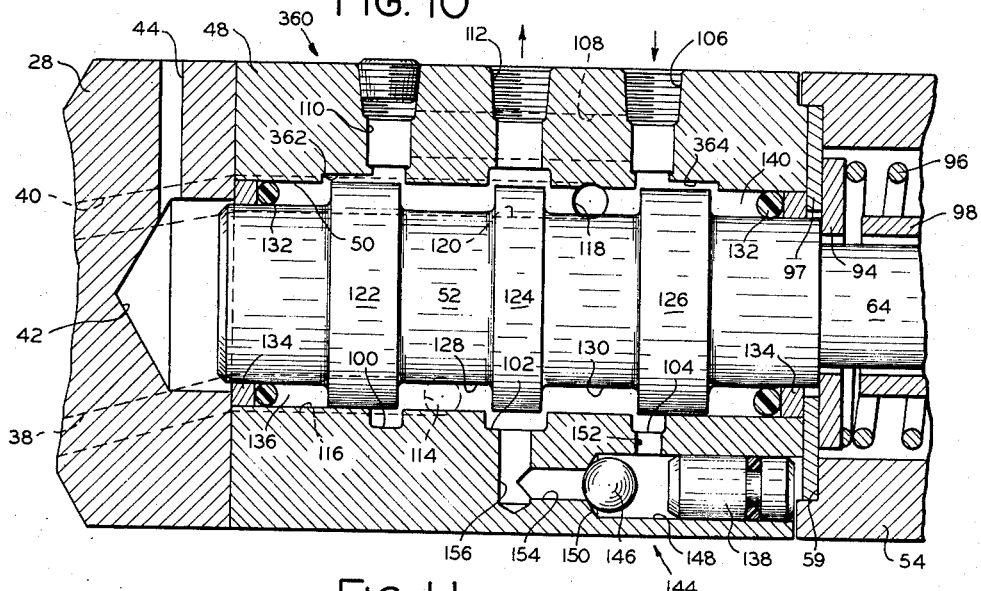
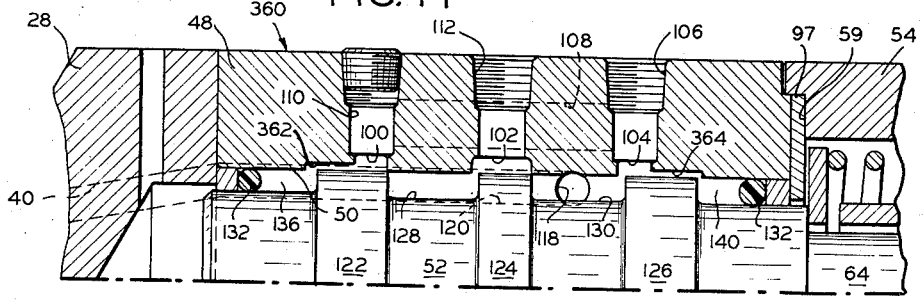
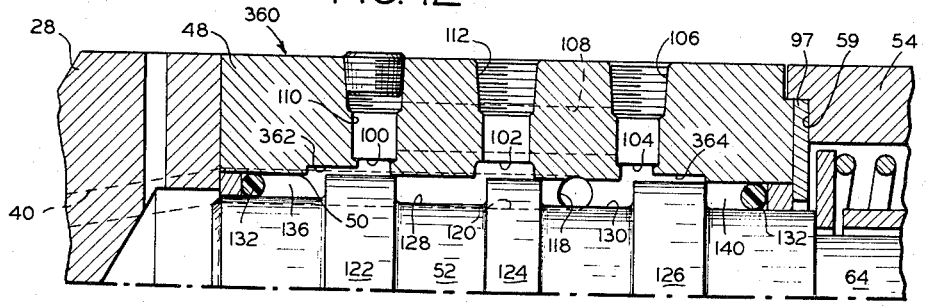
INVENTOR
RICHARD O. GORDON
BY
*Kenneth C. Witt*
ATTORNEY 3,176,721
HYDRAULIC VALVE
Richard O. Gordon, New Buffalo, Mich., assignor to Clark Equipment Company, a corporation of Michigan
Filed Oct. 4, 1963, Ser. No. 315,118
12 Claims. (Cl. 137—625.68)

This invention relates to hydraulic valves, and more particularly to socalled open-center, four-way valves of the type which may be utilized as a control valve in power steering systems.

This application is a continuation-in-part of the application, Serial No. 182,887, filed March 27, 1962, now abandoned.

As used herein an open-center valve means a valve which is so arranged that when the valve is in the neutral position hydraulic fluid flows continuously through the valve from the inlet port to the outlet port without significant restriction. When the valve is moved from the neutral position to an operating position, pressure immediately builds up because the fluid is redirected to a servo motor or similar device and can no longer flow directly to the outlet port, the pressure being dependent upon the resistance that must be overcome to operate the servo motor; and this enables the energy of the pressurized hydraulic fluid to be utilized for operating a servo motor or other device. "Four-way" valve as used hereinafter has reference to the fact that the valve has four ports. One of these is an inlet port and another is the outlet port, while the other two ports are connected to the servo motor or other device to be operated by the valve.

In a vehicle having dirigible wheels and equipped with a servo type power steering system there is generally a double-acting piston and cylinder type fluid actuator connected at one end to a fixed part of the vehicle frame and connected at the other end to the steering linkage so that extension and retraction of the piston rod causes the dirigible wheels to pivot in one or the other direction, thus steering the vehicle. The flow of fluid to and from the cylinder is controlled by a power steering control valve which may be a four-way open-center valve. The servo type power steering system also has follow-up means whereby the position of the dirigible wheels of the vehicle is directly responsive to the position of the operator's steering wheel or, in other words, the position of the dirigible wheels changes only so long as the operator's steering wheel is being turned. To provide such a follow-up arrangement mechanically the valve body of the power steering control valve conveniently may be connected to the steering linkage, while the valve spool of the power steering control valve is connected to the operator's steering wheel through an intermediate steering linkage which normally includes a drag link and Pitman arm linkage which is connected through a sector gear and a worm gear to the operator's steering wheel. The follow-up for a steering control valve also may be provided by fluid means, as will be explained in conjunction with a modification of my invention. If desired, the piston and cylinder type actuator and the power steering control valve conveniently may be a unitary assembly.

Also, while there is referred to herein a vehicle having dirigible wheels which may be turned with respect to the frame or body portion of the vehicle in order to accomplish steering, it will be appreciated that the power steering systems embodying the valve of this invention likewise may be utilized with an articulated vehicle. Such a vehicle has two separate frame portions, a tractor portion and a trailer portion, with the two frame portions interconnected by combined draft and steering coupling and it is steered by pivoting one frame portion of the vehicle with respect to the other frame portion.

A servo type power steering system functions satisfactorily in a large majority of installations; however, a small percentage of vehicles equipped with such a power steering system do not react smoothly. On these vehicles the force required to break the dirigible wheels loose and begin steering while the vehicle is standing still, or moving very slowly, is substantially greater than the force required to keep the dirigible wheels moving in steering operation once they are in motion. In such vehicles it appears that when the operator's steering wheel is moved to initiate valve spool travel relative to the valve body, the power steering pump pressure applied to the power steering cylinder begins to build up to a peak pressure without any substantial movement of the power steering actuator, steering linkage or dirigible wheels. Energy also is being stored in the flexing of the tires relative to the surface thereon; in the mechanical "wind-up" of the steering linkage, ball joints, king pin bearings; deflection in the linkages; hose expansion; etc. When the wheels finally begin steering movement, the entire system accelerates very rapidly whereby the system quickly acquires a relatively high velocity. The valve body or spool (depending upon the type of control valve in the system and its arrangement therein) consequently moves past or overshoots the neutral position to an open position in the opposite direction, directing pressure fluid to the other end of the cylinder. The same energy build-up occurs in the opposite direction. When the energy build-up is sufficient the dirigible wheels again break loose and the system accelerates as before, acquiring a relatively high velocity in the opposite direction and the control valve body or spool again overshoots the neutral position. Such action may be self-sustaining, causing the dirigible wheels and linkage to be subject to violent forces and motions. This action or oscillation is ordinarily described as chatter or shimmy. It may sometimes be induced with a snap of the steering control wheel when the vehicle is standing still or while it is rolling slowly.

The overshooting of the control valve body or spool past the neutral position and resultant oscillation is a very costly and serious problem to the manufacturers of power steering systems and servo devices. There are a number of arrangements used by such manufacturers to try to correct power steering system, i.e., control chatter or oscillation; however, none of these arrangements is completely effective. A great many power steering manufacturers make use of hydraulic reaction areas in the steering control valves, for example. Generally, this arrangement requires a compromise in order to stabilize a vehicle having power steering which is subject to chatter. That is, in a power steering system having a valve with hydraulic reaction areas, the system may be stabilized by increasing the area of the respective hydraulic reaction areas, but such an increase in the hydraulic reaction area also results in an increase in the force which must be applied at the rim of the operator's steering wheel in order to steer the vehicle. In some situations the increase in area of the hydraulic reaction area necessary to stabilize the power steering system results in an objectionably heavy force being required at the rim of the operator's steering wheel. On the other hand, if the area of the hydraulic reaction area is reduced to the point where the force required at the rim of the operator's steering wheel is no longer objectionable, then the power steering system is no longer stable. Consequently, one may be trapped between an unstable power steering system with an acceptable steering wheel effort and a stable power steering system having an undesirably heavy steering wheel effort.

It is a principal object of my invention to provide means to stabilize a power steering system without resulting in an unduly large force being required at the rim of the operator's steering wheel to steer the vehicle.

Another object of my invention is to provide a valve that prevents overshooting and oscillation in a servo system.

A further object of my invention is to provide a steering control valve which may be employed to stabilize any power steering system substantially independently of the steering control wheel effort, neutral position back pressure, or steering speed.

In carrying out my invention in one form thereof, I provide an elongated valve body having a longitudinally extending bore. Communicating with the bore is a pair of longitudinally spaced apart fluid inlet ports adjacent the ends of the bore, a fluid outlet port disposed between the fluid inlet ports and a pair of longitudinally spaced apart fluid motor ports located respectively between the fluid outlet port and the fluid inlet ports. A spool is slidably disposed in the bore and has three longitudinally spaced apart lands thereon. The two outermost lands on the spool define a chamber adjacent each end of the spool. A chordal groove extends partially across the outer surface of each of the two outermost lands and serves to communicate the adjacent chamber with the adjacent fluid inlet port when the spool is centered. As the valve spool is shifted in one direction fluid is forced out of one of the fluid chambers first through the connecting chordal groove and then through the clearance between the spool and bore when the chordal groove is shut off. At the same time communication between the other fluid chamber and inlet port through the connecting chordal groove is maintained.

In carrying out my invention in another form thereof, I provide a valve similar to the one described above, except that a pair of lands on the spool closes off communication between the fluid motor ports and the bore when the spool is centered and the spool is hollow and arranged to be shifted by differential fluid pressure.

In carrying out my invention in still another form thereof, I provide a valve similar to the one first described hereinabove, except that the chordal grooves on the lands are omitted and a pair of chordal grooves are located in the wall of the valve bore.

The above objects and other objects, features and advantages of my invention will become more readily apparent to a person skilled in the art from the following detailed description when taken in conjunction with the attached drawing in which:

FIGURE 2 is an enlarged fragmentary view of the control valve of FIG. 1;

FIGURES 3, 4 and 5 are similar to FIG. 2, except that only the portion of the control valve above the centerline is shown and the valve spool has been shifted from the neutral position to a partially open position, a further open position and a fully open position, respectively;

FIGURE 10 is a longitudinal section of a further modification of my invention; and FIGURES 11 and 12 are similar to FIG. 10, except that only a portion of the control valve above the center-line is shown and the valve spool has been shifted from the neutral position to a partially open position and a further opened position, respectively.

Figure 1:
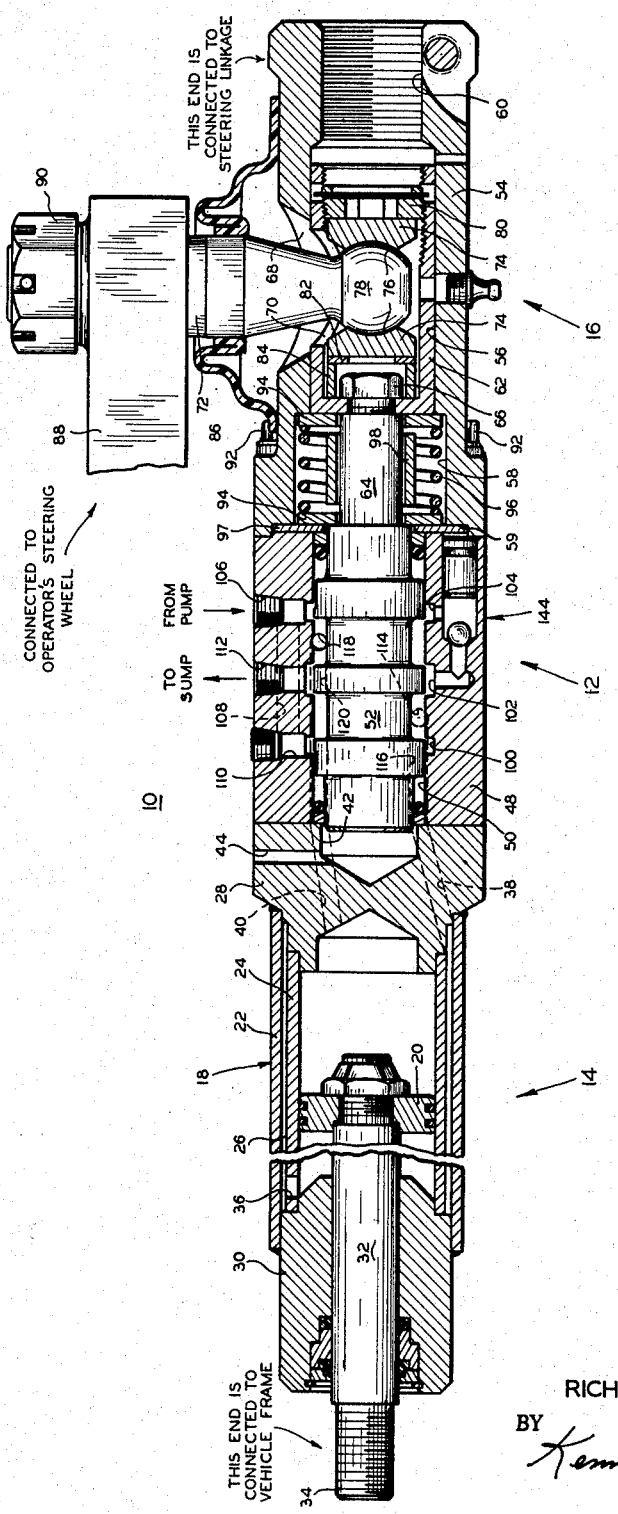
FIGURE 1 is a longitudinal section of a power steering assembly embodying my invention.

Referring now to FIG. 1, the numeral 10 denotes generally a power steering mechanism including a control valve 12 to which is secured at opposite ends thereof respectively a double-acting piston and cylinder type fluid actuator or motor 14 and a ball stud control assembly 16.

Fluid actuator 14 includes a cylinder 18 and a piston 20 slidably disposed within cylinder 18 for reciprocal movement therein. The cylinder 18 is of double wall construction and has an outer sleeve 22 and an inner sleeve 24, the sleeves cooperating to define an annular longitudinally extending fluid passage 26 therebetween. Outer sleeve 22 is secured to a cylinder head end portion 28, preferably by welding. Secured to the other end of outer sleeve 22 is a piston rod end portion 30. A piston rod 32 is connected to piston 20 and extends outwardly through piston rod end portion 30 and has a threaded end 34 which is adapted to be pivotally connected to a vehicle frame. Annular fluid passage 26 is connected to the interior of cylinder 18 at the piston rod end thereof by means of a port 36 in inner sleeve 24 and connects at the other end thereof with fluid passage 38 in cylinder head end portion 28, passage 38 being registrable with another fluid passage in valve 12 as will be explained hereinafter. Cylinder head end portion also has disposed therein a fluid passage 40 which opens into the interior of cylinder 18 at the head end thereof and is registrable at the other end thereof with another fluid passage also to be explained in more detail shortly hereinafter. In addition, cylinder head end portion 28 has disposed in the right end surface thereof a bore 42. Bore 42 is connected with the atmosphere by means of a passage 44 which, as will be seen, serves to bleed off any fluid leaking into bore 42 which otherwise would become trapped therein and prevent proper operation of steering control valve 12.

The control valve 12 has a body or housing portion 48 which is secured to the right end of cylinder head portion 28. A bore 50 extends longitudinally through valve body 48 and has slidably disposed therein a valve spool 52.

Secured to the end of valve body 48 opposite cylinder head end portion 28 in a manner to be explained is a ball stud control assembly 16. Control assembly 16 includes a housing 54 which has a longitudinally extending bore 56, a counterbore 58, a recess 59 and an internally threaded portion 60 adjacent the end opposite valve body 48. Threaded portion 60 forms part of a pivotal connection between power steering assembly 10 and the steering linkage (not shown). A cup-shaped sleeve member 62 is slidably disposed in bore 56 and connected to a necked down portion 64 of spool valve 52 by means of a machine screw 66, as shown. Aligned openings 68 and 70 are provided in housing 54 and sleeve 62, respectively, for a ball stud 72. The ball stud 72 is held in a socket formed by a pair of blocks 74 disposed in sleeve 62, each having a hemispherical surface 76 which cooperates with a ball portion 78 of stud 72, thus providing a connection capable of limited pivotal movement in any direction. Blocks 74 are held in abutment with ball portion 78 by member 80 which threadably engages sleeve 62. In order to prevent the ball stud connection from rattling, a spring washer 82 is inserted between an annular spacer 84 and one of blocks 74. A resilient cover 86 fits around stud 72 and against housing 74 to prevent dirt and other foreign matter from entering the ball stud connection. A drag link 88 may be connected to control ball stud 72 and may be held in place by means of a castellated nut 90. Drag link 88 ordinarily is connected to a Pitman arm (not shown) which in turn is connected through a suitable sector and worm gear mechanism to the operator's steering wheel so that rotational movement of the steering wheel results in axial movement of valve spool 52.

The control assembly 16, control valve 12 and fluid actuator 14 are secured together to form power steering assembly 10 by means of a plurality of long-shanked machine screws 92 which extend though housing 54 of control assembly 16 and valve body 48 and threadedly engage cylinder head end portion 28. Machine screws 92 are tightened down so that the abutting ends of cylinder head end portion 28, valve body 48 and housing 54 are held in fluid sealing relation.

Disposed in counterbore 58 is a pair of washers 94 through which necked down portion 64 of valve spool 52 passes and which are held in abutment with sleeve 62 and the shoulder formed by the necked down portion 64, respectively, by a helical spring 96 disposed between the washers. Also, when spool 52 is centered, one of the washers 94 abuts an annular ring 97 which is held in recess 59 between valve body 48 and control housing 54. The washers 94 and helical spring 96 cooperate with sleeve 62, the shoulder of valve spool 52 and annular ring 97 to maintain valve spool 52 in a centered or neutral position or return it thereto, as shown in FIG. 1.

Disposed between washers 94 and within helical spring 96 is an annular spacer member 98 which serves to limit the stroke of valve spool 52 in either direction by the amount of clearance between spacer 98 and washers 94.

Referring now also to FIGS. 2 through 6, valve body 48, as pointed out hereinabove, includes a longitudinally extending bore 50. Disposed in bore 50 are three longitudinally spaced apart annular grooves 100, 102 and 104. An inlet port 106 in the valve body communicates directly with groove 104, and also is in communication with groove 100 by means of connecting passages 108 and 110. The inlet port 106 is adapted to be connected to a source of pressurized fluid. An outlet port 112 in the valve body communicates directly with groove 102. Outlet port 112 can, of course, be connected to a sump or reservoir (not shown) by any suitable fluid passage means. A fluid motor or actuator port 114 is disposed between grooves 100 and 102 and opens into bore 50. One end of port 114 connects with a longitudinally extending passage 116 which registers with passage 38 so that fluid motor port 114 is in communication with the piston rod end of the interior of cylinder 18. Another fluid motor or actuator port 118 is disposed in valve body 48 between grooves 102 and 104. Fluid motor port 118 communicates at one end thereof with bore 50 and is connected at the other end thereof with a longitudinally extending fluid passage 120 which registers with fluid passage 40 so that fluid motor port 118 communicates with the head end of the interior of cylinder 18. Passages 38, 40, 116 and 120 and fluid motor port 114 are shown in dotted outline to indicate that they actually lie out of the plane of the section in FIGS. 1 through 6.

Referring now principally to FIG. 2, valve spool 52 is shown disposed in the neutral or centered position. Valve spool 52 has three longitudinally spaced apart annular lands 122, 124 and 126. These lands define therebetween a pair of annular grooves 128 and 130. It will be noted that fluid motor port 114 is always in communication with groove 128, and similarly fluid motor port 118 is always in communication with groove 130.

Each end of valve spool 52 is sealed to prevent the escape of pressure fluid by means of an O-ring type seal 132 of resilient material which is prevented from being pushed out of bore 50 due to the force exerted thereon by pressure fluid by a metallic back-up washer 134.

Figure 7:
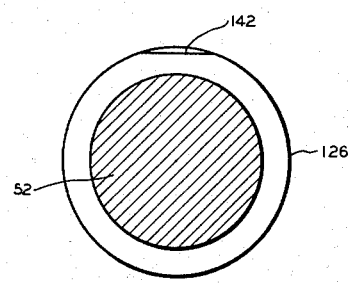
FIGURE 7 is a cross-sectional view taken along line 7—7 of FIG. 2.

The land 122 together with the adjacent seal 132 and bore 50 defines a fluid chamber 136 which in the neutral position of the valve is in communication with groove 100 by means of a chordal groove 138 which extends partially across the surface of land 122. Similarly, a fluid chamber 140 is defined by land 126, seal 132 and bore 50 at the other end of valve spool 52. Chamber 140 is in fluid communication, in the neutral position of the valve, with groove 104 by means of a chordal groove 142 (see FIG. 7) which extends partially across the surface of land 126. As will be explained in more detail hereinafter, these chambers and chordal grooves function as dash pots under certain conditions of valve operation.

When the valve spool 52 is in the position shown in FIGS. 1 and 2, steering control valve 12 is in a neutral position. In neutral, the fluid flow is in through inlet port 106, the fluid flow dividing and one-half of the fluid flowing to groove 100 and one-half of the fluid flowing to groove 104. From groove 100 to fluid flow is into groove 128 and then to groove 102. Similarly fluid flow from groove 104 is to 130 and then to groove 102. From groove 102 the fluid flow is to outlet port 112 and hence to the sump or reservoir. The flow of fluid through the valve 12 in the neutral condition is substantially unrestricted so that only minimal pressures are built up in the valve. This results in the pump which is supplying inlet port 106 with fluid being in a substantially unloaded condition which is highly desirable. Also, fluid chambers 136 and 140 are in fluid communication with grooves 100 and 104, respectively, and fluid motor ports 114 and 118 are in communication with grooves 128 and 130, respectively. Thus, the valve will be maintained full of fluid and minimal pressure will be maintained on each side of piston 20.

Referring now principally to FIG. 3 wherein spool valve 48 is shown displaced slightly to the right so that groove 100 is no longer in communication with groove 128, and groove 130 is no longer in communication with groove 102, the fluid flow to and from cylinder 18 is such that actuator 14 extends with the result that the steering angle of the dirigible wheels is changed in one direction. In this condition of control valve 12 fluid flow is from a pump to inlet port 106 which connects with groove 104 and hence to groove 130. From groove 130 fluid flow is through fluid motor port 118, passages 120 and 40 to the head end of the interior of cylinder 18. At the same time, fluid is being forced out of the piston rod into cylinder 18 and out through fluid motor port 114 (FIG. 2) into groove 128. From groove 128 the fluid flow is to groove 102 and hence to the sump via outlet port 112. At this point of spool displacement, chambers 136 and 140 are both still in fluid communication with grooves 100 and 104, respectively. However, fluid is being forced out of chamber 140 at a restricted rate via chordal groove 142.

Referring now principally to FIG. 4 wherein valve spool 52 is shown displaced farther to the right so that chamber 140 is no longer in direct fluid communication with groove 104 via chordal groove 142, the fluid flow remains the same as the fluid flow in the position of the valve shown in FIG. 3, except that the fluid trapped in chamber 140 must now be forced out through the clearance between land 126 and bore 50 with any further rightward movement of spool 52.

Figure 5:
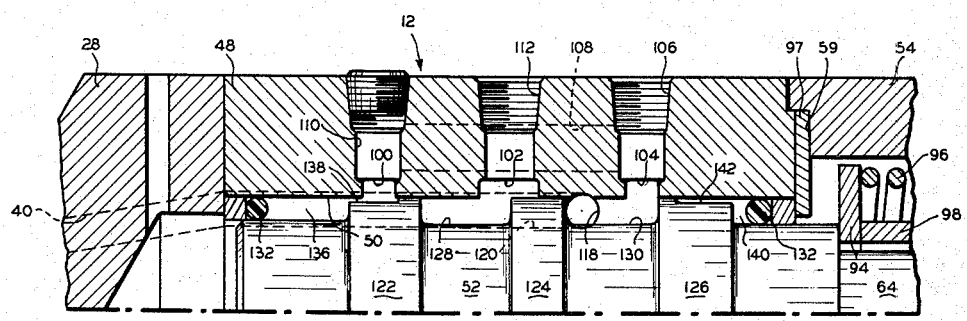

When valve spool 52 is shifted to the extreme limit of its rightward movement, as shown in FIG. 5, the fluid flow is the same as in FIG. 4.

A safety check valve 144 is provided in valve body 48. This valve includes a ball 146 (see FIG. 2) disposed in a bore 148 which normally is held in fluid sealing relation against a seat 150 by fluid pressure communicated to bore 148 by a passage 152 which connects groove 104 with bore 148. Bore 148 also is connected to groove 102 by means of connecting passages 154 and 156. The end of bore 148 opposite seat 150 is closed by means of a solid plug 158. In the event of fluid pressure failure it is still possible to steer the vehicle manually by moving valve body 48 in one direction or the other depending upon which direction it is desired to change the steering angle of the dirigible wheels. That is, the valve spool 52 is moved the full extent of its movement relative to valve body 48 in either direction, and thereafter carries valve body 48 and the rest of the power steering assembly connected to the steering linkage with it due to the cooperation of washers 94, spacer 98 and the shoulders adjacent the washers 94. For all practical purposes, the result is as though the drag link and Pitman arm linkage were connected directly to the steering linkage. When the vehicle is being steered, fluid is being displaced from one side of piston 20 in cylinder 18. Assuming that valve spool 52 is moved to the right and carrying valve body 48 with it, fluid is being displaced from the piston rod end of cylinder 18 from which it flows via fluid motor port 114 into groove 128. Due to the increasing volume in cylinder 18 on the head end side of piston 20 ball 146 is unseated and the fluid in groove 128 is pulled through groove 102 into connecting passages 156 and 154 and hence into bore 148. From bore 148 the fluid is pulled through passage 152 into grooves 104 and 130 and fluid motor port 118 and hence into the head end of cylinder 18. The result of this essentially is that fluid in the cylinder on one side of the piston is transferred to the cylinder on the other side of the piston. If such a fluid transfer were not provided for by safety check valve 144, then a vacuum would be created in cylinder 18 on one side of piston 20, and thus prevent full manual steering of the vehicle.

It will be understood that fluid seals, such as O-rings, although not described in detail, except for seals 132, have been used throughout the power steering assembly 10 where necessary to provide means for preventing fluid leakage between various surfaces.

Turning now to the operation of the above-described embodiment of my invention, it will be assumed that power steering assembly 10 is associated with a vehicle having dirigible wheels and that movement of ball stud 72 to the right as seen in FIG. 1 causes the steering angle of the dirigible wheels to change so that the vehicle makes a right turn when traveling forwardly. Assuming now that valve spool is initially in the neutral position shown in FIGS. 1 and 2, the vehicle will travel in a straight line and pressure fluid will flow from the pump through steering control valve and return to the sump with substantially unrestricted flow. Further, fluid pressure will be maintained on each side piston 20 so that should the dirigible wheels hit any normal obstructions the vehicle will not deviate from a straight line.

Now, if ball stud 72 is actuated to the right so that the valve spool 52 is moved from the position shown in FIGS. 1 and 2 to one of the positions shown in FIGS. 3 through 5, the steering angle of the dirigible wheels will be changed so that the vehicle will execute a right turn. It will be noted that as spool 52 is being moved to the right, fluid is being forced out of chamber 140 into groove 104 by way of chordal groove 142. When spool 52 is shifted sufficiently far enough to the right (FIGS. 4 and 5), the fluid remaining in chamber 140 can no longer be forced out through chordal groove 142, but must flow through the clearance between land 126 and bore 50 in the area of chordal groove 142. (While the drawings do not appear to show a clearance between bore 50 and spool 52 because of its small size, it will be appreciated that there is actually a clearance of 0.0002–0.0003 inch.) The force required to force the fluid out of chamber 140 across land 126 is off-set in part by the pressure of fluid in chamber 136 which exerts a force against land 122. The net result is that to move spool 52 from the position shown in FIG. 4 to the position shown in FIG. 5 at a normal steering speed requires approximately an additional four pounds of force at the rim of the operator's steering wheel in addition to approximately two pounds of force required to overcome the bias of the centering spring. While I prefer to arrange chordal grooves 138 and 142 so that approximately four pounds of additional force at the rim of the operator's steering wheel is required to actuate the spool, it should be pointed out that the force required at the rim of the operator's steering wheel can be varied from a negative force (that is, the system will be self-steering once the spool 52 is shifted from the neutral position) to such a high force that an operator could not manually turn the operator's steering wheel by having the chordal grooves extend across more or less of the lands, respectively, and extend to a greater or lesser depth into the respective lands. Steering speed is dependent upon the extent of displacement of spool valve 52 relative to valve body 48, the fastest steering speed being obtained when the valve spool 52 is fully displaced, as shown in FIG. 5. It is to be noted that for minor steering corrections the retarding effect of the fluid chambers is not very great because neither one of chordal grooves 138 and 142 is cut off from the adjacent inlet port. Thus, an operator may steer the vehicle along a nominally straight line course while using a force (three pounds, for example) only slightly above that required to overcome the centering spring. On the other hand, pronounced changes in the course of the vehicle require a greater force at the steering wheel (six pounds, for example) since one of the chordal grooves will be cut off from the adjacent inlet port, thus greatly increasing the dash pot effect of the chamber out of which fluid is being forced.

Figure 6:
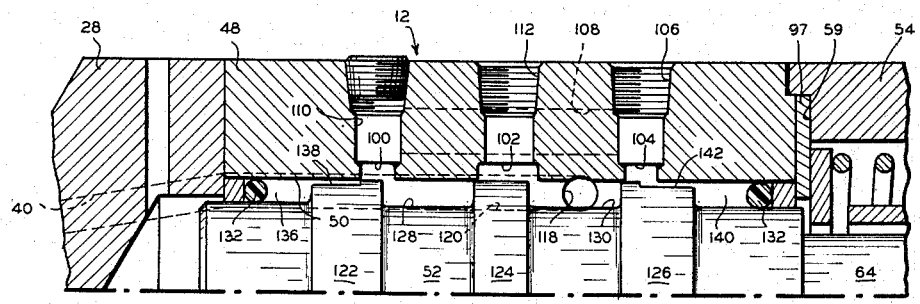
FIGURE 6 is a view wherein the valve body has overshot the neutral position after the valve spool has initially been shifted to the right.

Thus far I have explained the operation of my invention under conditions which do not tend to cause the power steering system to oscillate. Assuming now that the vehicle is moving slowly or stopped so that initial movement of spool 52 to the right does not result in movement of the dirigible wheels to the right, but rather results in a build-up of energy in the steering system. In such an event, the dirigible wheels will break loose and begin to steer when the spool valve 52 is someplace between the position shown in FIG. 3 and the position shown in FIG. 5. When this occurs the valve body 48 is accelerated rapidly to the right, overshooting the neutral valve position to some position, such as shown in FIG. 6, fluid contained in chamber 136 being forced out into groove 100 by way of chordal groove 138 and then through the clearance between bore 50 and spool 52 when body 48 has moved far enough to close off chordal groove 138. The result of all this is that chamber 136 acts as a dash pot and body 48 cannot move faster than a predetermined rate because any faster rate of movement would result in a fluid displacement rate from chamber 136 that would raise the fluid pressure therein to a point where the force being exerted on body 48 to move it to the right would be less than the force exerted by the pressure fluid in chamber 136 to retard rightward movement of body 48. Consequently, before body 48 can return toward or overshoot the neutral position to any extent, depending upon the amount of energy stored in the power steering system, the energy stored in the power steering system will have had time to be dissipated through unwinding of the steering linkage, unflexing of the tires, etc. It will be appreciated that when chamber 136 is acting as a dash pot to retard overshooting of valve body 48 there is a substantial force applied to spool 52 which tends to move it to the right; however, because of the lead angle of the worm and sector gear connection of the operator's steering wheel to the valve spool 52, the amount of force required to turn the worm gear in reverse through the sector gear is so high that there is almost no force transmitted to the steering wheel from valve spool 52.

Figure 8:
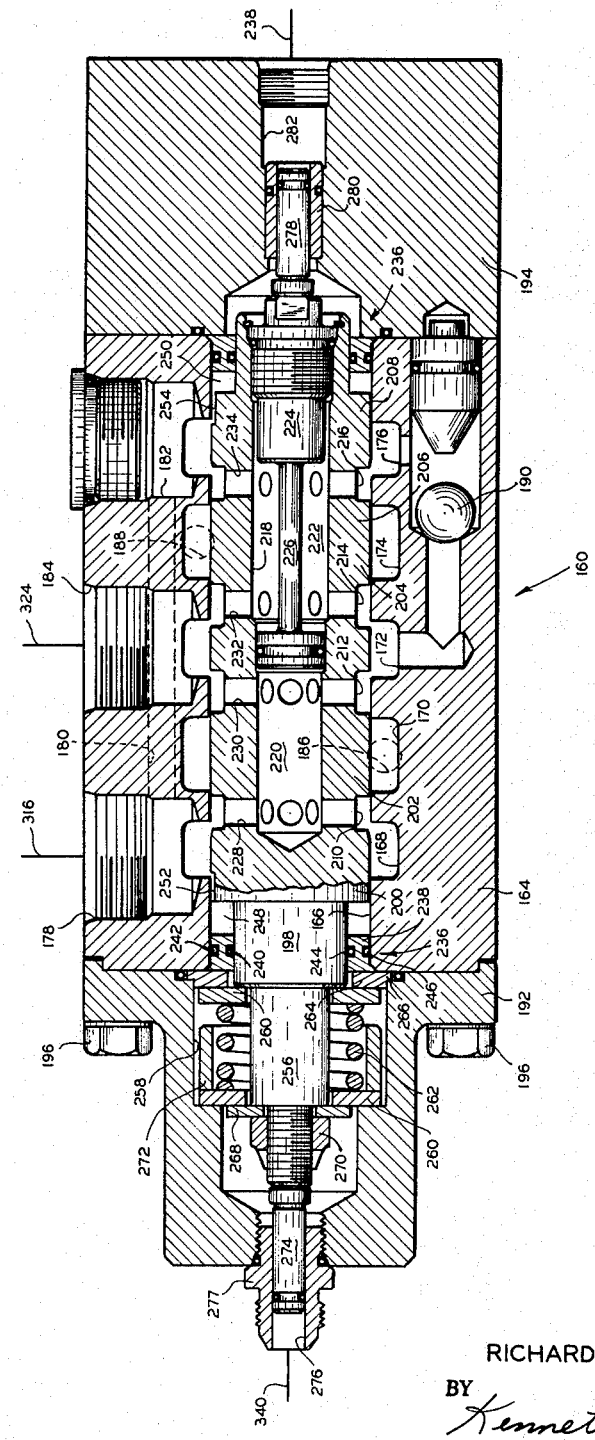
FIGURE 8 is a longitudinal sectional view of a modification of my invention.
Figure 9:
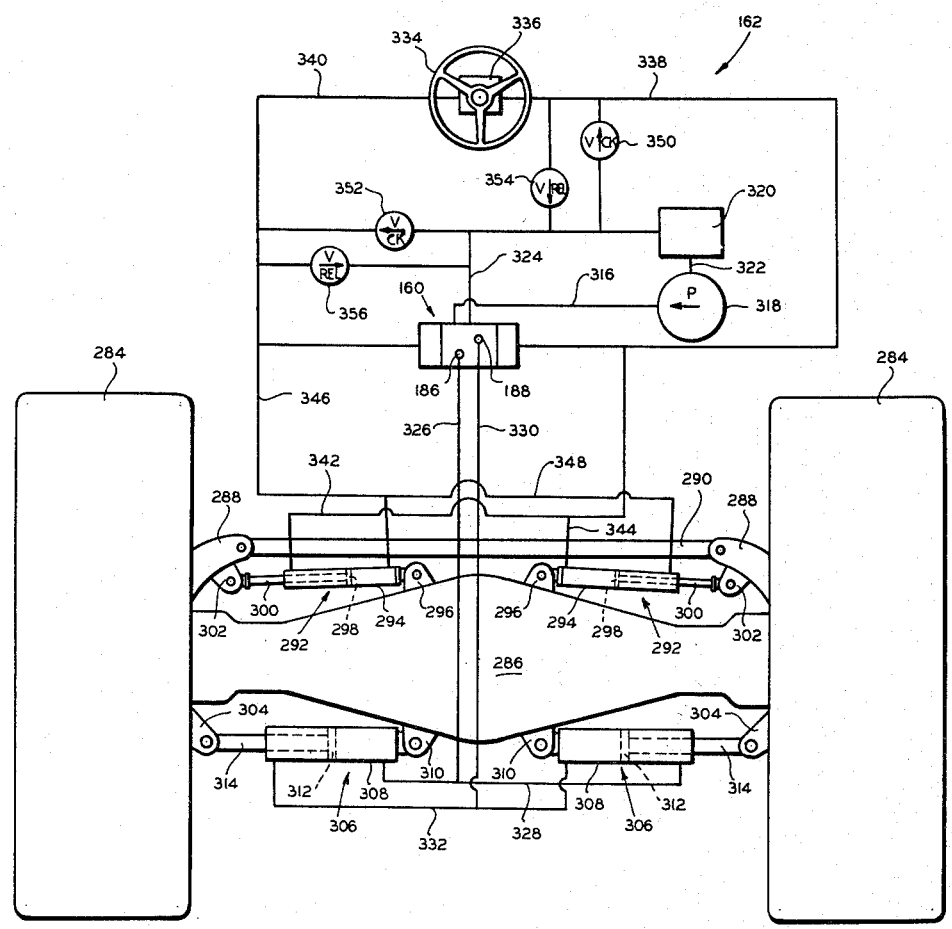
FIGURE 9 is a schematic representation of a power steering system embodying the control valve shown in FIG. 8.

Referring now to FIG. 8, the reference numeral 160 denotes a modified valve suitable for use with a power steering system 162 of the type shown in FIG. 9. Valve 160 differs from above-described valve 12 in that it has closed fluid motor ports. That is, when the spool is in a neutral or centered position fluid cannot flow into or out of the fluid motor ports. Further, the spool is shifted by means of differential fluid pressure applied to the ends thereof and is provided with fluid follow-up means.

Valve 160 includes an elongated body 164 having a longitudinally extending bore 166. In the surface of bore 166 are longitudinally spaced apart annular grooves 168, 170, 172, 174 and 176. A fluid inlet port 178 is disposed in body 164 and connects with annular groove 168. A pair of connecting passages 180 and 182 serve to connect groove 176 with fluid inlet port 178. Groove 172 communicates with a fluid outlet port 184 in body 164, and grooves 170 and 174 communicate, respectively, with fluid motor ports 186 and 188 in body 164. (Passage 180 and ports 186 and 188 are shown in dotted outline to indicate that they lie out of the plane on which the section of FIG. 8 is taken.) Also disposed in body 164 is a safety check valve 190 which connects grooves 172 and 176. This valve is identical in construction and operation to safety check valve 144 which was described in detail hereinabove. Consequently, reference is made thereto for a description of the construction and operation of valve 190.

A pair of end blocks 192 and 194 are secured to opposite ends of valve body 164 by means of a plurality of long shanked machine screws 196 which extends through end block 192 and valve body 164 and threadably engage in block 194. Machine screws 196 are tightened sufficiently to hold the adjoining surfaces of end blocks 192 and 194 with valve body 164 in fluid sealing relation.

Slidably disposed within bore 166 is a spool 198. Spool 198 includes longitudinally spaced apart annular lands 200, 202, 204, 206 and 208. These lands define respectively therebetween grooves 210, 212, 214 and 216.

Extending coaxially into spool 198 from one end thereof is a bore 218. Bore 218 is divided into two chambers 220 and 222 by means of an elongated plug 224 disposed therein which has a reduced diameter portion 226.

A plurality of radially extending passages 228 connect chamber 220 with groove 210. Chamber 220 also is connected with groove 212 by means of a plurality of radially extending passages 230. Likewise, a plurality of radially extending passages 232 connects chamber 222 with groove 214 and another plurality of passages 234 connects groove 216 with chamber 222.

Fluid is prevented from flowing out of the ends of bore 166 by means of a pair of seals 236 located at opposite ends of the bore and disposed between the bore and the spool. Each seal 236 includes an annular supporting ring 238 with circumferential grooves 240 and 242 in the inner and outer peripheries thereof, respectively. Disposed in grooves 240 and 242 are O-ring type seals 244 and 246 of any suitable resilient material.

Lands 200 and 208 define respectively with bore 166 and seals 236 a pair of fluid chambers 248 and 250 at opposite ends of spool 198. Fluid chambers 248 and 250 are in communication respectively with groove 168 and groove 176 in the centered position of spool 198, as seen in FIG. 8, by means of chordal grooves 252 and 254 cut in the surfaces of lands 200 and 208, respectively. These fluid chambers function as dash pots under certain conditions and prevent overshooting and oscillation of the spool, as will be explained more fully hereinafter.

One end of spool 198 includes a necked down portion 256 which extends into a counterbore 258 in end block 192. Located at opposite ends of necked down portion 256 is a pair of washer members 260. Disposed between washer members 260 is a helical spring 262 which tends to bias one of the washer members 260 into abutting relation with the shoulder formed on spool 198 by necked down portion 256, and also into abutting relation with a seal retaining member 264 which is held in position between valve body 164 and end block 192 by means of a flange portion 266 thereon. Spring 262 also biases the other washer members 260 into abutting relation with a washer retaining member 268 which is secured to spool 198 by means of a nut 270, and also into abutting relation with the shoulder formed by counterbore 258. Washer members 260 and spring 262 function to maintain spool 198 in a centered position, as shown in FIG. 8, and return it thereto following a displacement of the spool from the centered position thereof.

An annular spacer member 272 is disposed between washer 260 and serves to limit the stroke of spool 198 to the clearance between spacer member 272 and washer members 260.

Connected to the left end of spool 198, as viewed in FIG. 8, is a piston 274 which is slidably disposed in a cylinder 276 in a fitting 277 which is threadably secured to end block 192. Similarly, a piston 278 is secured to the other end of spool 198 and is slidably disposed in a cylinder insert 280 which is disposed in a bore 282 in end block 194. As will be explained shortly, the ends of pistons 274 and 278 are subject to fluid pressure. Thus, the position of spool 198 can be changed by changing the pressure balance on the ends of pistons 274 and 278. That is, so long as the fluid pressure on the ends of both pistons is equal spool 198 will remain in the neutral position; however, if there is a pressure unbalance on the ends of the pistons, then spool 198 will move in the direction of lower fluid pressure.

When valve 160 is in the neutral position, as shown in FIG. 8, the fluid flow will be into inlet port 178 where it divides substantially evenly, one-half flowing to groove 168 and one-half flowing to groove 176. From groove 168 fluid flows into groove 210, through passages 218 into chamber 220, radially outwardly through passages 230 into groove 212 and from there into groove 172. In a similar manner from groove 176 the fluid flows into groove 216, through passages 234 into chamber 222, radially outwardly through passages 232 into groove 214 and from there in to groove 172. From groove 172 the fluid flow is into outlet port 184 and from there to the reservoir or sump. It will be noted that in the neutral position lands 202 and 206 close off grooves 170 and 174 from communication with bore 166 so that there is no fluid flow into or out of fluid motor ports 186 and 188.

Upon initial movement of spool 198 to the right groove 210 is put into communication with groove 170 and groove 214 is put into communication with groove 174. At the same time communication between groove 168 and groove 210 and groove 172 and groove 214 is being closed off. The result is that in addition to the fluid flow described above for the neutral condition of the valve, some fluid is beginning to flow into fluid motor port 188 and out of fluid motor port 186.

Further shifting of spool 198 to the right results in completely closing off communication between groove 168 and groove 210, and also between groove 172 and groove 214. The fluid flow now is from inlet port 178 through connecting passages 180 and 182 into groove 176. From groove 176 fluid flow is through spool 198 via chamber 222 into groove 174 and from there to fluid motor port 188. At the same time fluid flowing into valve body 164 through fluid motor port 186 passes into groove 170. From groove 170 the fluid flow is into chamber 220 by way of groove 210 and passages 218. From chamber 220 the fluid flow is radially outwardly through passages 230 into groove 212 and from there to groove 172 which leads to fluid port 184 and hence the reservoir.

During rightward movement of spool 198, fluid will be forced out of chamber 250, first through chordal groove 254, and then as it is closed off through the clearance between spool 198 and bore 166. (While spool 198 and bore 166 are shown in what appears to be line-to-line contact, there is actually a clearance of 0.0002–0.0003 inch between them.) At the same time pressure fluid in chamber 248 will be exerting a force on the left end of spool 198 which tends to overcome the retarding effect on the movement of spool 198 caused by the fluid being forced out of chamber 250. The length and depth of chordal grooves 252 and 254 is chosen so that the retarding effect of the fluid being forced out of chamber 250 during rightward movement of spool 198 can be overcome by the force applied to the left end of spool 198 by pressure fluid in chamber 248 and the pressure fluid acting on piston 274, for the ordinary speed of displacement of spool 198. However, in the case where there is energy build up in the power steering system which causes the spool to move rapidly to the right, then the force required to force the fluid out of chamber 250 is so high that the energy build up in the power steering system is dissipated before spool 198 has overshot the centered position to any substantial extent.

An action similar to the one described above takes place for movement of spool 198 to the left.

Referring now to FIG. 9, I will describe a typical power steering system 162 with which valve 160 may be used. Power steering system 162 is shown in conjunction with a pair of dirigible wheels 284 connected to opposite ends of an axle 286 of a vehicle for pivotal movement about a pair of vertical axes.

Extending inwardly from each dirigible wheel 284 is an arm 288. A tie rod 290 is pivotally connected opposite ends to arms 288, to cause or to assure that movement of one of the dirigible wheels about its vertical axis results in a related movement of the other dirigible wheel.

Connected between arms 288 and axle 286 is a pair of follow-up actuators 292 which extend inwardly from arms 288 and substantially parallel to tie bar 290. Each follow-up actuator 292 includes a cylinder 294 pivotally connected to axle 286 by means of a pin and bracket connection 296. Slidably disposed in cylinder 294 is a piston 298 to which is secured a piston rod 300 that is pivotally connected at the end opposite piston 298 to arm 288 by means of a pin and bracket connection 302. The function of follow-up actuators 292 is to provide a hydraulic follow-up for valve 160 in the power steering system as will be explained in more detail shortly.

Also secured to dirigible wheels 284 on the opposite side of axle 286 from arms 288 is a pair of inwardly extending arms 304. Connected between arms 304 and axle 286 is a pair of double-acting fluid motors 306. Each fluid motor includes a cylinder 308 which is pivotally connected to axle 286 by means of a pin and bracket connection 310. Slidably disposed within cylinder 308 is a piston 312 to which is secured a piston rod 314. The end of piston rod 314 opposite piston 312 is pivotally connected to arm 304 so that extension or retraction of piston rod 314 causes pivotal movement of dirigible wheels 284 about their vertical axes. For a more detailed explanation of the operation of a steering axle of this type reference may be had to U.S. Patent 2,945,544, assigned to the same assignee as the present invention, which discloses and claims such an axle.

Power steering system 162 includes a control valve 160. Pressurized fluid is supplied to inlet port 178 (FIG. 8) through a conduit 316 which is connected to a supply pump 318 that draws fluid from a reservoir 302 through a conduit 322. The fluid outlet port 184 (FIG. 8) of valve 160 is connected to reservoir 320 by means of a return conduit 324. Fluid motor port 186 is connected to a fluid conduit 326 which connects with another fluid conduit 328 that connects the head end of one of the fluid motors 306 with the rod end of the other fluid motor 306. Likewise, fluid motor port 188 is connected to a fluid conduit 330 which connects with another fluid conduit 332 which connects the rod end of one of the fluid motors 306 with the head end of the other fluid motor 306. The result of this connection of fluid motors 306 with fluid motor ports 186 and 188 is that when fluid motor port 186 is supplied with pressure fluid the fluid motors 306 will be actuated to pivot wheels 284 in a clockwise direction, the supplying of pressure fluid to fluid motor port 188 causing fluid motors 306 to pivot wheels 284 in a counterclockwise direction. It will be noted at this point that valve 160 is located remotely from fluid motors 306 in contradistinction to valve 12.

Located at an operator's station on the vehicle associated with the power steering system is an operator's steering wheel 334 which is connected to a positive displacement type fluid pump 336 so that a counterclockwise rotation of steering wheel 334 causes fluid to flow from conduit 338 through pump 336 into conduit 340. Conduit 338 is connected to bore 282 in end block 194 (FIG. 8) and conduit 340 is connected to fitting 276 in end block 192 (FIG. 8). It will be clear at this point that counterclockwise rotation of steering wheel 334 will cause the fluid pressure in conduit 340 to rise and the fluid pressure in conduit 338 to drop with the result that the forces being exerted on opposite ends of spool 198 through pistons 274 and 278 are unbalanced so that spool 198 will be moved to the right. Conversely, clockwise rotation of steering wheel 334 will cause spool 198 to move to the left.

The follow-up for valve 160 is provided by means of follow-up actuators 292. The rod end of one of the actuators 292 is connected with conduit 338 by a conduit 342 and is connected in parallel with the head end of the other actuator 292 by a conduit 344. Similarly, the head end of the one actuator 292 is connected with fluid conduit 340 by means of a fluid conduit 346 and is connected in parallel with the rod end of the other actuator 292 by means of a conduit 348. Pivotal movement of wheels 284 in either direction causes actuator 292 to draw fluid from the conduit connected to one side of spool 198 and supply fluid to the conduit connected to the other side of spool 198 so that the pressures acting on the end of the spool are equalized with the result that spool 198 is returned to the neutral position.

In order to replace fluid lost by leakage from conduits 338 and 340 a one-way check valve 350 is provided between conduit 338 and return conduit 324 and a one-way check valve 352 is provided between conduit 340 and return conduit 324. These check valves allow fluid to be drawn into conduits 338 and 340 from conduit 324 to replace fluid lost by leakage.

In order to prevent excessive pressures in conduits 338 and 340 a pair of check valves 354 and 356 communicate these conduits respectively with return conduit 324.

I will now describe the operation of valve 160 in conjunction with power steering system 162. It will be assumed that power steering system 162 is associated with a vehicle which is moving forwardly (upwardly in FIG. 9) in a straight line and that the operator wishes to turn the vehicle to the left by pivoting wheels 284 in a counterclockwise direction. Counterclockwise rotation of steering wheel 334 causes fluid pressure in conduit 340 to rise and fluid pressure in conduit 338 to drop so that a greater force is being exerted on piston 274 than is being exerted on piston 278. Consequently, spool 198 will shift to the right so that pressurized fluid from fluid inlet port 178 is communicated to fluid motor port 188 and hence to fluid motors 306 so that dirigible wheels 284 pivot in a counterclockwise direction. Fluid motor port 186 is connected through valve 160 to fluid outlet port 184 so that fluid being displaced from fluid motors 306 is returned to reservoir 320 through return conduit 324. At the same time, counterclockwise movement of dirigible wheels 284 causes fluid to be forced out of one end of actuators 292 and into conduit 338 via conduits 342 and 344. Also, fluid is being pulled into the other ends of actuators 292 from conduit 340 via conduits 346 and 348. This action of actuators 392 equalizes the fluid pressures in conduits 338 and 340 so that spool 198 is returned to the neutral position, thus providing valve 160 with a follow-up.

The operation of steering system 162 which has been described thus far applies to vehicle operation which does not present the problem of spool 198 overshooting the neutral position. In the situation where the vehicle is standing still, or moving very slowly, and initial movement of steering wheel 334 does not initiate any substantial spool travel relative to the valve body, power steering pump pressure builds up without any substantial movement of the fluid motors, steering linkage or dirigible wheels. The energy stored in the build up of this pressure, along with the energy being stored in the deflection of the linkages, hose expansion and so forth results in a rapid acceleration of the entire system when steering movement finally begins. Assuming that steering wheel 334 has been rotated counterclockwise, as described above, so that dirigible wheels 284 will pivot in a counterclockwise direction, the rapid acceleration of these wheels when they break loose and begin steering causes fluid to be forced out of actuators 292 so fast that the pressure in conduit 338 is raised above the pressure in conduit 340, rather than equalized. Thus, spool 198 would be moved rapidly to the left, except for the dash pot action of chamber 248. More specifically, spool 198 cannot be moved to the left above a predetermined rate because any faster rate of movement would result in a fluid displacement rate from chamber 248 that would raise the fluid pressure therein to a point where the force being exerted on the right end of spool 198 by the fluid pressure in line 338 would not be as large as the force exerted by the pressure fluid in chamber 248. Consequently, before spool 198 can overshoot the neutral position to any substantial extent the energy stored in the power steering system will have had time to be dissipated through unwinding of the steering linkage, unflexing of the tires, etc. As a result spool 198 will not tend to oscillate, and so power steering system 162 will be stable.

Referring now to FIG. 10, the reference numeral 360 denotes a further modified valve suitable for use with a power steering system. Valve 360 differs from the valve shown in FIGS. 1 through 7 only in that the chordal grooves 138 and 142 of the previously described valve 12 are omitted from valve lands 122 and 126 respectively and are replaced by a pair of grooves 362 and 364 in the wall of bore 50. Except for this difference in structure, valve 360 is identical with valve 12, and so like reference numerals have been applied to like parts. Reference is made to the description hereinabove in regard to valve 12 for the remainder of the structural description of valve 360.

The operation of valve 360 is substantially identical with the operation of valve 12, and so need not be further described here, except to note that groove 362 cooperates with land 122 to control communication between chamber 136 and groove 100 and groove 364 cooperates with land 126 to control communication between chamber 140 and groove 104. FIGS. 11 and 12 illustrate the relative movement of spool 52 toward the right whereby land 126 cooperates with groove 364 to first retard fluid communication between groove 104 and chamber 140 via groove 364 and finally to shut off fluid communication between groove 104 and chamber 140 via groove 364 with the result that any further displacement of fluid from chamber 140 must be through the clearance between land 126 and the wall of bore 50 which is on the order of 0.0002 to 0.0003 of an inch.

While I have shown and described three embodiments of my invention in conjunction with a power steering system, it will be understood that numerous modifications, changes and substitutions could be made thereto by a person skilled in the art without departing therefrom. For example, the hook-up of the steering control valve may be reversed, i.e., the valve spool may be connected to the steering linkage and the valve body may be operatively connected to the operator's steering wheel. For this reason the detailed description and drawing are intended to be illustrative only. The scope of my invention should be determined from the appended claims taken in conjunction with the prior art.

I claim:

1. A valve comprising an elongated body having a longitudinally extending bore, a pair of longitudinally spaced apart fluid inlet ports in said body communicating with said bore, a spool slidably disposed in said bore, a pair of fluid seals disposed between said spool and said bore at opposite ends of said bore for preventing fluid from escaping out of the ends of said bore, at least two longitudinally spaced apart annular lands on said spool, the said two lands defining with said seals and said bore a pair of fluid chambers located respectively at opposite ends of said bore adjacent said inlet ports, and a pair of chordal grooves in the surface of said two lands, each chordal groove extending partially across the surface of the respective land from the outer edge thereof so that when said spool is in a centered position relative to said body said chordal grooves communicate respectively said fluid chambers with the fluid inlet port adjacent thereto and when said spool is shifted a predetermined distance in one direction one of said chordal grooves no longer connects one of said chambers and the inlet port adjacent thereto.

2. A valve comprising an elongated body having a longitudinally extending bore, a pair of longitudinally spaced apart fluid inlet ports in said body communicating with said bore, a spool slidably disposed in said bore, at least two longitudinally spaced apart annular lands on said spool, the said two lands defining with said bore a pair of fluid chambers located respectively at opposite ends of said bore adjacent said inlet ports, passage means in each of the said two lands connecting respectively said chambers and adjacent inlet ports when said spool and said body are in a centered position and disposed so that when said spool is shifted a predetermined distance in one direction away from center one of said passage means no longer connects one of said chambers and the inlet port adjacent thereto and when said spool is shifted a predetermined distance in the other direction from center the other of said passage means no longer connects the other chamber and inlet port adjacent thereto.

3. A valve comprising an elongated body having a longitudinally extending bore, a pair of longitudinally spaced apart fluid inlet ports in said body, a fluid outlet port in said body located between said inlet ports, a pair of fluid motor ports in said body located respectively between said outlet port and inlet ports, all of said ports communicating with said bore, a spool slidably disposed in said bore, at least two longitudinally spaced apart annular lands on said spool, the said two lands defining with said bore a pair of fluid chambers located respectively at opposite ends of said bore and adjacent said inlet ports, and a groove in the surface of each of said lands, each groove extending partially across the surface of the respective land from the outer edge thereof and connecting the adjacent chamber with the adjacent inlet port in a centered spool position.

4. A valve comprising an elongated body having a longitudinally extending bore, a pair of longitudinally spaced apart fluid inlet ports in said body, a fluid outlet port in said body located between said inlet ports, a pair of fluid motor ports in said body located respectively between said outlet port and said inlet ports, all of said ports communicating with said bore, a spool slidably disposed in said bore, three longitudinally spaced apart annular lands on said spool, the two outer lands defining with said bore a pair of fluid chambers located respectively at opposite ends of said bore and adjacent said inlet ports, and passage means in each of the two outer lands connecting the adjacent chamber with the adjacent inlet port in a centered spool position, said passage means cooperating with said inlet ports so that when the relative position of said spool and said body is shifted a predetermined distance in one direction one of said passage means continues in communication with the adjacent inlet port while communication of the other of said passage means with the adjacent inlet port is cut off.

5. A valve comprising an elongated body having a longitudinally extending bore, a pair of longitudinally spaced apart fluid inlet ports in said body, a fluid outlet port in said body located between said inlet ports, a pair of fluid motor ports in said body located respectively between said outlet port and said inlet ports, all of said ports communicating with said bore, a spool slidably disposed in said bore, a pair of fluid seals disposed between said spool and said bore at opposite ends of said bore for preventing fluid from escaping out of the ends of said bore, three longitudinally spaced apart annular lands on said spool, said lands defining a pair of annular grooves therebetween spaced so that one of said fluid motor ports is always in communication with one of said annular grooves and the other of said fluid motor ports is always in communication with the other of said annular grooves, the two outer lands defining with said seals and said bore a pair of fluid chambers located respectively at opposite ends of said bore, each of the said two outer lands having a groove in the surface thereof which extends from the outer edge thereof partially across said surface and connects the adjacent chamber and inlet port in a centered spool position.

6. A valve comprising an elongated body having a longitudinally extending bore, first, second and third longitudinally spaced apart annular grooves in the wall of said bore, said second groove being located between said first and third grooves, a fluid inlet port in said body connected to said third groove, fluid passage means in said body connecting said fluid inlet port with said first groove, a fluid outlet port in said body connected to said second groove, a first fluid motor port in said body disposed between said first and second grooves, a second fluid motor port in said body disposed between said second and third grooves, said fluid motor ports communicating with said bore, a spool slidably disposed in said bore, a pair of fluid seals disposed between said spool and said bore at opposite ends of said bore for preventing fluid from escaping out of the ends of said bore, first, second and third longitudinally spaced apart annular lands on said spool, said lands defining fourth and fifth annular grooves therebetween spaced so that said first fluid motor port is always in communication with said fourth groove and said second fluid motor port is always in communication with said fifth groove, said first and third lands defining respectively with said seals and said bore first and second fluid chambers, first and second chordal grooves located respectively in the surfaces of said first and third lands, said chordal grooves extending partially across the surface of the respective land from the outer edge thereof, said grooves and lands cooperating so that in a first spool position said first and third grooves are connected respectively with said first and second chambers by means of said first and second chordal grooves and connected with said second groove and said first and second fluid motor ports by means of said fourth and fifth grooves, respectively, and in a second spool position said second chordal groove no longer connects said third groove with said second chamber, said fifth groove no longer connects said third groove with said second groove and said fourth groove no longer connects said first groove with said first fluid motor port and said second groove.

7. A valve comprising an elongated body having a longitudinally extending bore, a pair of longitudinally spaced apart fluid inlet ports in said body, a fluid outlet port in said body located between said fluid inlet ports, a pair of fluid motor ports in said body located respectively between said outlet port and said inlet ports, all of said ports communicating with said bore, a spool slidably disposed in said bore, a first pair of annular lands on said spool which block communication of said fluid motor ports with said bore when said spool is in a centered position, first passage means in said spool for connecting one of said fluid inlet ports with said outlet port when said spool is in said centered position, second passage means in said spool for connecting the other of said fluid inlet ports with said outlet port when said spool is in said centered position, a second pair of annular lands disposed on said spool outwardly of said first pair of lands, said second pair of lands defining with said bore a pair of fluid chambers located at opposite ends of said bore and adjacent said fluid inlet ports, third passage means for connecting one of said chambers with the adjacent fluid inlet port when said spool is in a centered position, and fourth passage means for connecting the other of said fluid chambers with the adjacent fluid inlet port when said spool is in said centered position, said third and fourth passage means being disposed so that when said spool is shifted a predetermined distance in one direction from said centered position communication between said third passage means and the adjacent fluid inlet port is shut off and when said spool is shifted a predetermined distance in the other direction from said centered position communication between said fourth passage means and the adjacent fluid inlet port is shut off.

8. A valve comprising an elongated body having a longitudinally extending bore, a pair of longitudinally spaced apart fluid inlet ports in said body, a fluid outlet port in said body located between said fluid inlet ports, a pair of fluid motor ports in said body located respectively between said outlet port and said inlet ports, all of said ports communicating with said bore, a spool slidably disposed in said bore, a first pair of annular lands on said spool which block communication of said fluid motor ports with said bore when said spool is in a centered position, first passage means in said spool for connecting one of said fluid inlet ports with said fluid outlet port when said spool is in a centered position, second passage means in said spool for connecting the other of said fluid inlet ports with said outlet port when said spool is in said centered position, a second pair of annular lands disposed on said spool outwardly of said first pair of lands, said second pair of lands defining with said bore a pair of fluid chambers located at opposite ends of said bore and adjacent said fluid inlet ports, each of the said two outer lands having a groove in the surface thereof which extends from the outer edge thereof partially across said surface and connects the adjacent chamber with the adjacent fluid inlet port when said spool is in said centered position.

9. A valve comprising an elongated body having a longitudinally extending bore, first, second, third, fourth and fifth longitudinally spaced apart annular grooves in the surface of said bore, a fluid inlet port in said body connected with said first groove, first passage means in said body for connecting said fluid inlet port with said fifth groove, a fluid outlet port in said body connected with said third groove, a first fluid motor port in said body connected with said second groove, a second fluid motor port in said body connected with said fourth groove, a spool slidably disposed in said bore, first, second, third, fourth and fifth longitudinally spaced apart annular lands on said spool, said lands defining therebetween sixth, seventh, eighth and ninth longitudinally spaced apart annular grooves, said second and fourth lands blocking communication of said second and fourth grooves with said bore when said spool is in a centered position, said sixth and ninth grooves communicating respectively with said first and fifth grooves when said spool is in said centered position, said seventh and eighth grooves communicating with said third groove when said spool is in said centered position, second passage means in said spool for connecting said sixth groove with said seventh groove, third passage means in said spool for connecting said eighth and ninth grooves, a pair of sealing means disposed between said spool and said bore at opposite ends of said bore for preventing fluid from flowing out of said bore, a first fluid chamber defined by said first land, said bore and one of said sealing means, a second fluid chamber defined by said fifth land, said bore and the other of said sealing means, a first chordal groove in the surface of said first land which extends partially across the surface thereof from the outer edge, and a second chordal groove which extends from the outer edge of said fifth land partially across the surface thereof, said chordal grooves connecting respectively said first chamber with said first groove and said second chamber with said fifth groove when said spool is in said centered position.

10. A valve comprising an elongated body having a longitudinally extending bore, a pair of longitudinally spaced apart fluid inlet ports in said body communicating with said bore, a spool slidably disposed in said bore, at least two longitudinally spaced apart annular lands on said spool, the said two lands defining with said bore a pair of fluid chambers located respectively opposite ends of said bore adjacent said inlet ports, two passage means connecting rsepectively said chambers and adjacent inlet ports when said spool and said body are in a centered position and disposed so that when said spool is shifted a predetermined distance in one direction away from center one of said passage means no longer connects one of said chambers and the inlet port adjacent thereto and when said spool is shifted a predetermined distance from center the other of said passage means no longer connects the other chamber and inlet port adjacent thereto.

11. A valve comprising an elongated body having a longitudinally extending bore, a pair of longitudinally spaced apart fluid inlet ports in said body, a fluid outlet port in said body located between said inlet ports, a pair of fluid motor ports in said body located respectively between said outlet port and inlet ports, all of said ports communicating with said bore, a spool slidably disposed in said bore, at least two longitudinally spaced apart annular lands on said spool, the said two lands defining with said bore a pair of fluid chambers located respectively at opposite ends of said bore and adjacent said inlet ports, and a pair of grooves in the wall of said bore, each groove extending along said wall from one of said inlet ports toward the adjacent chamber and connecting the adjacent chamber with the adjacent inlet port in a centered spool position, said grooves cooperating with said lands so that when the relative position of said spool and said body is shifted a predetermined distance in one direction one of said grooves continues in communication with the adjacent chamber while communication of the other of said grooves with the adjacent chamber is cut off.

12. A valve comprising an elongated body having a longitudinally extending bore, a pair of longitudinally spaced apart fluid inlet ports in said body, a fluid outlet port in said body located between said inlet ports, a pair of fluid motor ports in said body located respectively between said outlet port and said inlet ports, all of said ports communicating with said bore, a spool slidably disposed in said bore, three longitudinally spaced apart annular lands on said spool, the two outer lands defining with said bore a pair of fluid chambers located respectively at opposite ends of said bore and adjacent said inlet ports, and passage means in the wall of said bore connecting the adjacent chamber with the adjacent inlet port in a centered spool position, said passage means cooperating with the said two outer lands so that when the relative position of said spool and said body is shifted a predetermined distance in one direction one of said passage means continues in communication with the adjacent chamber while communication of the other of said passage means with the adjacent chamber is cut off.

References Cited by the Examiner
UNITED STATES PATENTS

| | | | |
|---|---|---|---|
| 2,785,699 | 3/57 | Creson et al. | 251—50 XR |
| 2,919,681 | 1/60 | Schultz | 251—50 XR |

M. CARY NELSON, *Primary Examiner.*
MARTIN P. SCHWADRON, *Examiner.*